United States Patent
Zhang et al.

(10) Patent No.: US 11,216,427 B2
(45) Date of Patent: Jan. 4, 2022

(54) METHOD, ELECTRONIC DEVICE AND COMPUTER-READABLE MEDIUM FOR MANAGING METADATA

(71) Applicant: EMC IP Holding Company LLC, Hopkinton, MA (US)

(72) Inventors: Alex Pengbo Zhang, Shanghai (CN); Xiao Chen, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 209 days.

(21) Appl. No.: 16/456,985

(22) Filed: Jun. 28, 2019

(65) Prior Publication Data

US 2020/0242092 A1 Jul. 30, 2020

(30) Foreign Application Priority Data

Jan. 29, 2019 (CN) .......................... 201910088229.8

(51) Int. Cl.
*G06F 16/215* (2019.01)
*G06F 16/23* (2019.01)
*G06F 16/28* (2019.01)

(52) U.S. Cl.
CPC ........ *G06F 16/215* (2019.01); *G06F 16/2379* (2019.01); *G06F 16/289* (2019.01)

(58) Field of Classification Search
USPC ....................................................... 707/689
See application file for complete search history.

(56) References Cited

U.S. PATENT DOCUMENTS

| | | | | |
|---|---|---|---|---|
| 6,453,325 | B1* | 9/2002 | Cabrera | G06F 11/1461 |
| 7,451,168 | B1* | 11/2008 | Patterson | G06F 12/0269 |
| 9,223,843 | B1* | 12/2015 | Madhavarapu | G06F 16/273 |
| 9,389,792 | B1* | 7/2016 | Camp | G06F 3/0655 |
| 9,460,008 | B1* | 10/2016 | Leshinsky | G06F 12/0238 |
| 9,460,389 | B1* | 10/2016 | Botelho | G06F 11/008 |
| 9,552,242 | B1* | 1/2017 | Leshinsky | G06F 11/0709 |
| 9,785,510 | B1* | 10/2017 | Madhavarapu | G06F 3/065 |
| 9,959,280 | B1* | 5/2018 | Whitehead | H04L 67/1097 |
| 10,409,692 | B1* | 9/2019 | Brenner | G06F 3/0671 |
| 10,922,297 | B2* | 2/2021 | Mittal | G06F 16/2255 |
| 2012/0124307 | A1* | 5/2012 | Ashutosh | G06F 11/1456 711/162 |
| 2017/0262365 | A1* | 9/2017 | Kanno | G06F 12/06 |
| 2019/0354620 | A1* | 11/2019 | Eluri | G06F 16/2322 |
| 2020/0242076 | A1* | 7/2020 | Stacey | H04L 67/2814 |

* cited by examiner

*Primary Examiner* — Cam Linh T Nguyen
(74) *Attorney, Agent, or Firm* — Amin, Turocy & Watson, LLP

(57) ABSTRACT

Embodiments of the present disclosure provide a method, an electronic device and a computer-readable medium for managing metadata. The method disclosed herein comprises: obtaining a check marker from a remote device; determining whether the check marker indicates that user data and metadata have been backed up in the remote device, the user data and the metadata being generated by an operation executed by a user on an object; and in response to the check marker indicating that the user data and the metadata have been backed up in the remote device, marking the metadata as removable metadata. In this way, the embodiments of the present disclosure can improve garbage collection efficiency of a storage system and execution efficiency of a metadata integration task.

20 Claims, 6 Drawing Sheets

US 11,216,427 B2

METHOD, ELECTRONIC DEVICE AND COMPUTER-READABLE MEDIUM FOR MANAGING METADATA

RELATED APPLICATION

The present application claims the benefit of priority to Chinese Patent Application No. 201910088229.8, filed on Jan. 29, 2019, which application is hereby incorporated into the present application by reference herein in its entirety.

FIELD

Embodiments of the present disclosure generally relate to a field of storage, and more specifically, to a method, an electronic device and a computer-readable medium for managing metadata.

BACKGROUND

Some storage systems such as Elastic Cloud Storage (ECS) system use geographic consistency to provide additional protection of user data. The storage system backs up the user data and metadata in local devices to one or more remote devices in different geographic locations, and the data in the local devices and remote device keeps final consistency. When failures occur in the local devices, the data in the local devices can be recovered from any of the remote devices.

In some storage systems, data in all types are stored in the form of chunk. When the object is updated, some parts of the respective chunks become useless garbage. The system needs to recycle the garbage to reuse resources. The current Garbage Collection (GC) is performed only after the relevant backups are completed because all data need to be backed up in the remote devices to keep geographic consistency, rendering low efficiency of GC.

SUMMARY

Embodiments of the present disclosure provide a method, an electronic device and a computer-readable medium for managing metadata.

In accordance with the first aspect of the disclosure, it provides a method for managing metadata comprising: obtaining a check marker from a remote device; determining whether the check marker indicates that user data and metadata have been backed up in the remote device, the user data and the metadata being generated by an operation executed by a user on an object; and in response to the check marker indicating that the user data and the metadata have been backed up in the remote device, marking the metadata as removable metadata.

In accordance with the second aspect of the disclosure, it provides an electronic device for managing metadata comprising: a processor; and a memory storing computer program instructions, the processor executing the computer program instructions in the memory to control the electronic device to perform acts comprising: obtaining a check marker from a remote device; determining whether the check marker indicates that user data and metadata have been backed up in the remote device, the user data and the metadata being generated by an operation executed by a user on an object; and in response to the check marker indicating that the user data and the metadata have been backed up in the remote device, marking the metadata as removable metadata.

In accordance with the third aspect of the disclosure, it provides a computer-readable medium comprising computer programs stored thereon, the computer program when executed by a processor by a processor causing the processor to perform following acts: obtaining a check marker from a remote device; determining whether the check marker indicates that user data and metadata have been backed up in the remote device, the user data and the metadata being generated by an operation executed by a user on an object; and in response to the location indicated by the check marker being the location of the log information or the location subsequent to the location of the log information, determining that the check marker indicates that the user data and the metadata have been backed up in the remote device.

It is to be understood that the invention is not intended to identify key or important features of embodiments of the present disclosure and not to limit the scope of the present disclosure. Other features of the present disclosure will be readily understood by the following description.

BRIEF DESCRIPTION OF THE DRAWINGS

Through the following detailed description with reference to the accompanying drawings, the above and other objectives, features, and advantages of embodiments of the present disclosure will become more understandable. Several embodiments of the present disclosure will be illustrated by way of example but not limitation in the drawings in which.

DETAILED DESCRIPTION OF EMBODIMENTS

Figure 1:
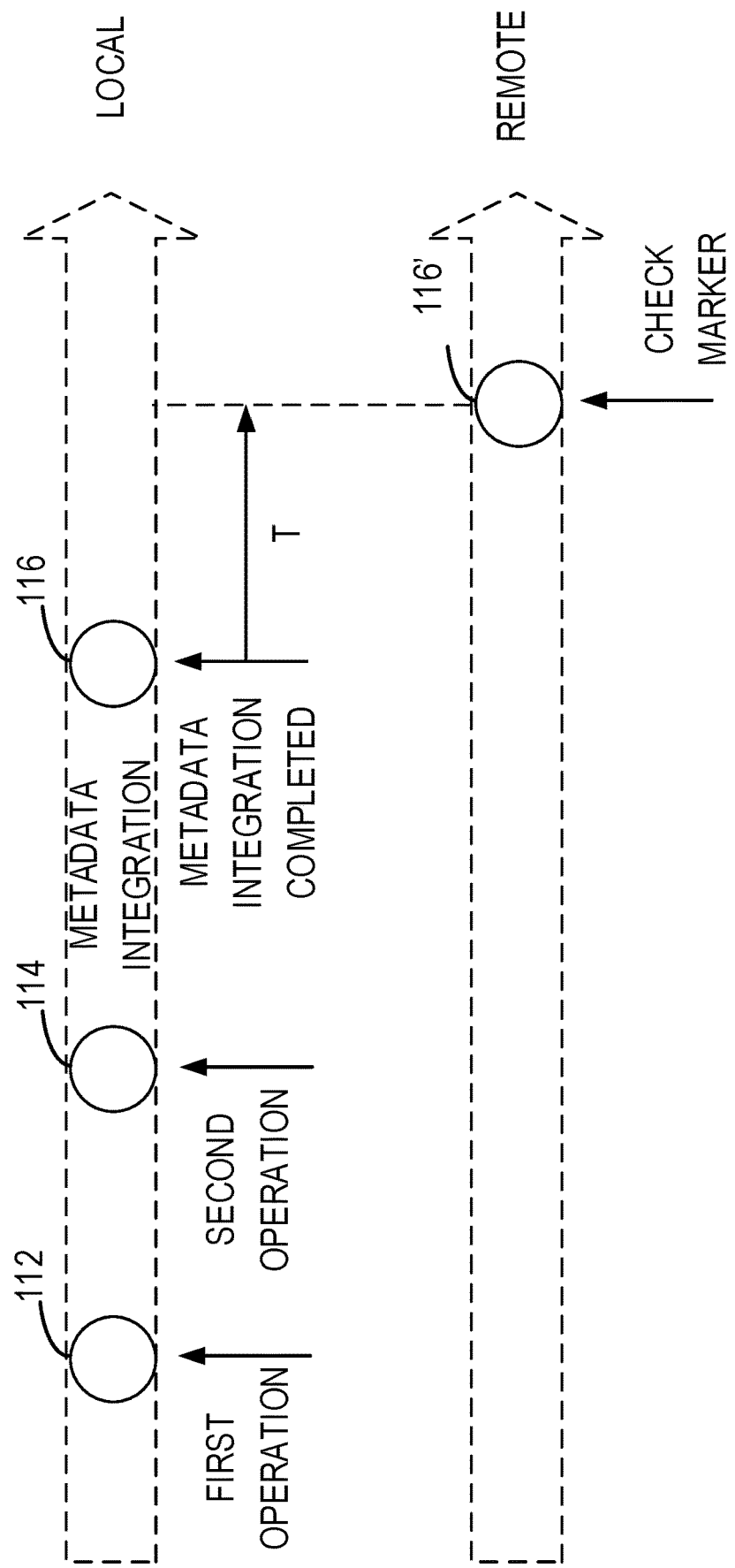
FIG. 1 illustrates a timing diagram of a current solution for managing metadata.

Concepts of the present disclosure will now be described with reference to various example embodiments illustrated in the drawings. It should be understood that description of those embodiments is merely to enable those skilled in the art to better understand and further implement example embodiments disclosed herein and is not intended to limit the scope disclosed herein in any manner. It should be noted that similar or identical reference numerals may be used in the drawings where possible and similar or identical reference numerals may indicate similar or identical elements. Those skilled in the art will appreciate that alternative embodiments of the structures and/or methods described herein may be employed without departing from the principles and concepts of the present disclosure.

As used herein, the term "includes" and its variants are to be read as open-ended terms that mean "includes, but is not limited to". The term "based on" is to be read as "based at least in part on." The term "one example embodiment" is to be read as "at least one example embodiment" and term "another example embodiment" is to be read as "at least one example embodiment". Other terms that may occur but are not mentioned herein are not to be interpreted or limited in a manner that is contrary to the concept on which the embodiments of the present disclosure are based, unless explicitly stated.

As described above, in some storage systems, logs, user data, and metadata generated by a user executing an operation on an object are stored in the form of chunk. The metadata is used to describe the user data, which can describe attributes of the user data to support functions such as indicating storage location, historical data, resource lookup, file recording, and the like. A log is a record used to store operations that a user executes on an object. Whenever a user executes an operation on an object (creating, updating, etc.), a corresponding log information is recorded in the log.

When an object is updated, some parts of the respective chunk in which the old data is stored will become useless garbage. The system needs to recycle the garbage to achieve resources reuse. For garbage collection, the system usually needs to clear the useless metadata and then clear the corresponding user data. Since all data in the local device needs to be fully backed up in the remote device to maintain geographic consistency, existing garbage collection needs to be executed after the relevant backups completed.

FIG. 1 illustrates a timing diagram of a solution for managing metadata. A point 112 represents the point in time at which the user executes a first operation on the object in the local device. The first operation may be a creation operation of object. The first operation generates first metadata and first user data (not shown). A point 114 represents the point in time at which the user executes a second operation on the object, and the second operation may be an update operation (modification, rewriting, deletion, etc.) of the object. The second operation generates second metadata and second user data (not shown). At the point 114, since the user updates the object, it is necessary to execute a metadata integration task on the first metadata and the second metadata generated by the first operation and the second operation to obtain updated metadata. A point 116 represents the point in time at which the first metadata and the second metadata are integrated and the updated metadata is obtained.

After the updated metadata is obtained, a part of the metadata in the first metadata generated by the first operation has become useless metadata, and the system may mark the first metadata as removable metadata, and the useless first metadata is then cleared by the metadata clearance task to achieve resource reuse. However, due to the geographical consistency of the storage system, the local device cannot immediately mark the first metadata as removable metadata, but needs to wait for the updated user data and metadata to be fully backed up in the remote device, after that, the metadata can be marked as removable metadata.

In order to determine that the user data and the metadata in the local device have been backed up in the remote device, the remote device performs consistency check on the backed up user data and metadata. The time range it usually takes to complete this consistency check is T. The time range T may generally include: the time T1 consumed by the log to be transmitted to the remote device over the network; the time T2 consumed by the remote device to reconstruct the corresponding metadata through the log; the time T3 consumed by checking that the user data corresponding to the reconstructed metadata has been backed up to the remote device.

A check marker can be generated when the remote device consumed at least time T to complete the consistency check. The check marker may indicate user data and metadata corresponding to which log information have been backed up in the remote device, wherein the check marker indicates the log information by indicating a location of the log information in the log. In the existing storage system, the local device records only the location of the log information completed by the metadata integration task. Therefore, the local device can only determine whether the check marker indicating whether the user data and metadata on which the metadata integration task have been performed are backed up in the remote device by determining whether the location indicated by check marker exceeds the location of the log information recording the metadata integration task have been completed.

As shown in FIG. 1, after the time T starting at point 116, the check marker updated at point 116' indicates that the user data and metadata on which the metadata integration task have been performed at point 116 has been backed up in the remote device. After the local device obtains the check marker, it can be determined that the user data and metadata generated before the point 116 are backed up in the remote device. In such a case, the local device can mark the first metadata as removable metadata, and then the metadata clearance task will clear the useless metadata in the metadata marked as removable. That is to say, the useless first metadata that has become garbage needs to be retained for a long time to be cleared. When there are lots of garbage to be recycled in the system, more space will be occupied for a long time. This leads to lower resource utilization.

In order to solve the above problem, an embodiment of the present disclosure provides a solution for managing metadata. The solution records the location of the log information associated with each operation executed on the object in the metadata, so when the check marker is obtained, it can be determined that which user data and metadata indicated by the check marker have been backed up in the remote device, the metadata is thus marked as removable metadata. In this way, the solution does not need to wait until the metadata integration task is completed and then obtains the corresponding check marker, thereby greatly shortening the waiting time for marking the useless metadata as removable metadata and improving the efficiency of garbage collection.

The basic principles and implementations of the present disclosure are described below with reference to the drawings. It should be understood that the exemplary embodiments are presented only to enable those skilled in the art to understand the embodiments of the present disclosure, rather than limit the scope of the disclosure in any way.

Figure 2:
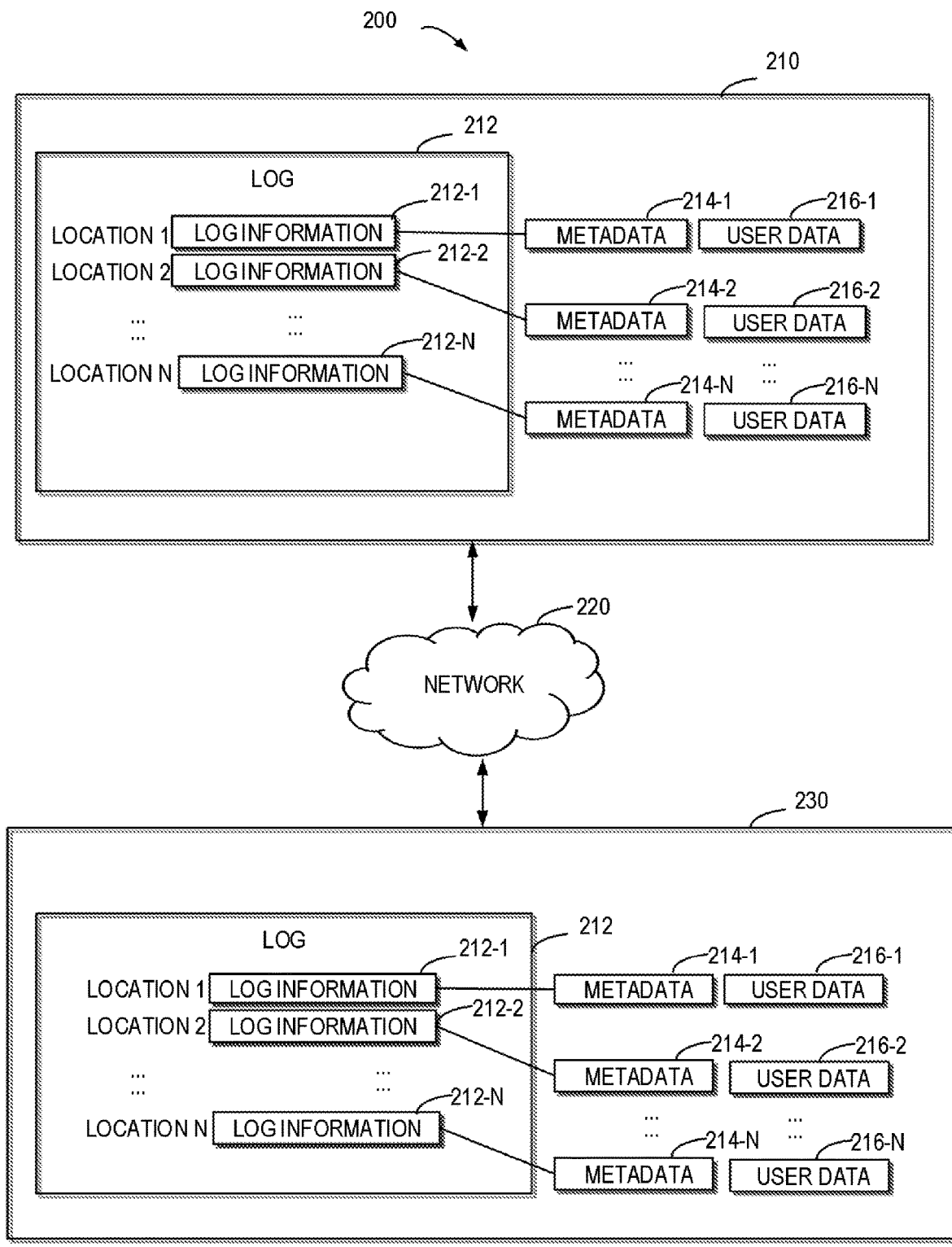
FIG. 2 illustrates a schematic diagram of example environment 200 for managing metadata according to an embodiment of the present disclosure.

FIG. 2 illustrates a diagram of exemplary environment 200 for managing metadata according to an embodiment of the present disclosure. As shown in FIG. 2, the environment 200 includes a local device 210, a network 220, and a remote device 230, the local device 210 and the remote device 230 can implement the transmission of various data over the network 220. The network 220 can be a wired network, a wireless network, or a combination of a wired network and a wireless network. For example, the network 220 can include, but is not limited to, the Internet, a wide area network, a metropolitan area network, a local area network, a virtual private network (VPN) network, a wireless communication network, and many more.

The local device 210 and remote device 230 are computing devices that provide storage, where "remote" means that local device 210 is separate from remote device 230, and local device 210 and remote device 230 can be computers, servers, or any other device which can be used to provide storage. The local device 210 and the remote device 230 may be single devices, or may be one or more groups of devices, which is not limited in this disclosure. Although the remote device 230 is shown in FIG. 2, it should be understood that this is for illustrative purposes only and is not intended to limit the scope of the disclosure. In some embodiments, remote device 230 can include a different number of remote devices and/or remote devices with different functionality.

As shown in FIG. 2, log information 212-1, 212-2, . . . , 212-N is recorded in the log 212. The local device 210 may also store metadata 214-1, 214-2, . . . , 214-N, user data 216-1, 216-2, . . . , 216-N, N is a positive integer greater than one. Based on the characteristics of the geographic consistency, the data in the remote device 230 is consistent with the data in the local device 210. Therefore, the same log information, metadata, and user data are also stored in the remote device 230. In some embodiments, when a user executes an operation on an object in the local device 210, the log information, metadata, and user data generated by the operation will be backed up in the remote device 230. The operation executes by the user on the object may be any suitable operation, for example, creation, modification, rewriting, deletion, etc., which is not limited in the present disclosure.

The log information 212-1, 212-2, . . . , 212-N are sequentially recorded at different locations of the log 212 in the order in which the operations executed by the user on the object. Therefore, all log information 212-1, 212-2, . . . , 212-N are recorded in the same log 212, and the order of the locations of log information 212-1, 212-2, . . . , 212-N recorded in the log 212 reflects the order in which the corresponding operations occur. In some embodiments, indications of the location of the corresponding log information 212-1, 212-2, . . . , 212-N are respectively recorded in the metadata 214-1, 214-2, . . . , 214-N. For example, the metadata 214-1 generated by the first operation executed by the user on the object is recorded with an indication of the location of the log information 212-1 associated with the first operation, and the metadata 214-2 generated by the second operation executed by the user on the object is recorded with an indication of the location of the log information 212-2 corresponding to the first operation, and so on. It should be understood that the "object" mentioned herein may be a single object or one of a plurality of different objects, which is not limited in the present disclosure. In this manner, the local device 210 can obtain the location of the log information corresponding to each operation.

Figure 3:
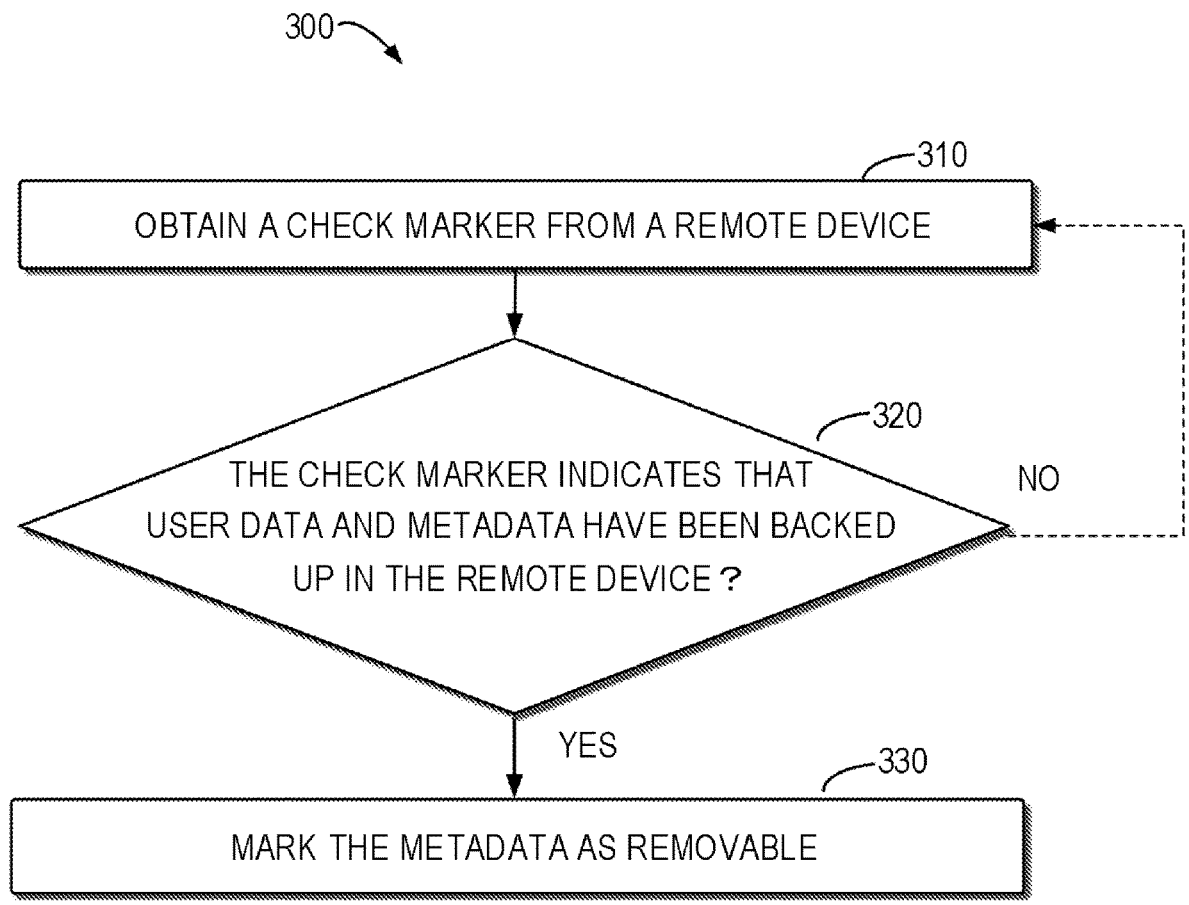
FIG. 3 illustrates a flow diagram of a method 300 for managing metadata according to an embodiment of the present disclosure.

FIG. 3 illustrates a flow diagram of a method 300 for managing metadata according to an embodiment of the present disclosure. It should be understood that at least a portion of method 300 can be executed by local device 210 described above with respect to FIG. 2. The method 300 may also include blocks not shown and/or the blocks wherein the shown may be omitted. The scope of the disclosure is not limited in this respect.

At block 310, the local device 210 obtains a check marker from the remote device 230. In some embodiments, the check marker may indicate which log information user data and metadata correspond to have been backed up in the remote device 230, the check marker indicates that the user data and metadata corresponding to the log information have been backed up in the remote device 230 by indicating a location of some log information corresponding to the user data and metadata recorded in the log.

In some embodiments, the remote device 230 sequentially checks whether the user data and local data corresponding to each log information are backed up in the remote device 230 in the order in which the log information is in the log. Whenever a group of user data and metadata having been backed up in the remote device 230 is checked, the remote device 230 updates the indication of the location of the check marker for the log information. For example, in conjunction with FIG. 2, when the metadata 214-1 and the user data 216-1 corresponding to the log information 212-1 being backed up in the remote device 230 are checked, the remote device 230 updates the check marker to indicate the location of information 212-1 in the log 212 (e.g., location 1); when the metadata 214-2 and user data 216-2 corresponding to the log information 212-2 being backed up in the remote device 230 are checked, the remote device 230 updates check marker to indicate the location of log information 212-2 in log 212 (e.g., location 2), and so on.

It should be understood that the local device 210 may obtain the check marker from the remote device 230 by any suitable means. For example, the local device 210 may receive the check marker issued by the remote device 230, or the local device 210 may read check marker from the remote device 230. The scope of the present disclosure is not limited thereto.

At block 320, the local device 210 determines whether the check marker indicates that user data and metadata have been backed up in the remote device 230. In some embodiments, the local device 210 can obtain an indication of the location of the log information from the metadata, and compare the location to the location indicated by the check marker. If the location indicated by the check marker is the location of the log information or the location subsequent to the location of the log information, it is determined that the check marker indicates that the user data and the metadata have been backed up in the remote device 230.

For example, in conjunction with FIG. 2, if the local device 210 wants to determine whether the check marker indicates the metadata 214-2 and the user data 216-2 have been backed up in the remote device 230, the local device 210 obtains the location of the corresponding log information 212-2 in the log from the metadata 214-2 (for example, location 2), and the local device 210 compares the obtained location indicated by the check marker with the location of the log information 212-2. If the location indicated by the check marker is also location 2, it indicates that the remote device 230 has just checked that the metadata 214-2 and the user data 216-2 have been backed up in the remote device 230. If the location indicated by the check marker is the location subsequent to location 2 (e.g., location 3), it means that the remote device 230 has previously checked that the metadata 214-2 and the user data 216-2 have been backed up in the remote device 230, that is, it can be determined that the metadata 214-2 and the user data 216-2 have been backed up in the remote device 230. If the location indicated by the check marker is the location prior to the location 2 (for example, location 1), it means that the remote device 230 only checks that the metadata 214-1 and the user data 216-1 are backed up, and cannot determine whether the metadata 214-2 and user data 216-2 are backed up at remote device 230. Thus, if the location indicated by the check marker is at location 2 or subsequent to location 2, the local device 210 can determine that metadata 214-2 and user data 216-2 have been backed up in the remote device 230. In this manner, the local device 210 can determine whether metadata and user data have been backed up in the remote device 230 at an earlier point in time At block 330, if the local device 210 determines at block 320 that the check marker indicates that user data and metadata have been backed up in the remote device 230, the metadata is marked as removable metadata. It should be noted that marking the metadata as removable metadata here does not actually clear the metadata, but only marking the metadata that has been checked by check marker to facilitate subsequent metadata clearance tasks. In this manner, the local device 210 can mark the metadata as removable metadata when the metadata and user data have been backed up in the remote device 230 without waiting for the time T after the metadata integration task is completed, which greatly improves the efficiency of garbage collection.

Figure 4:
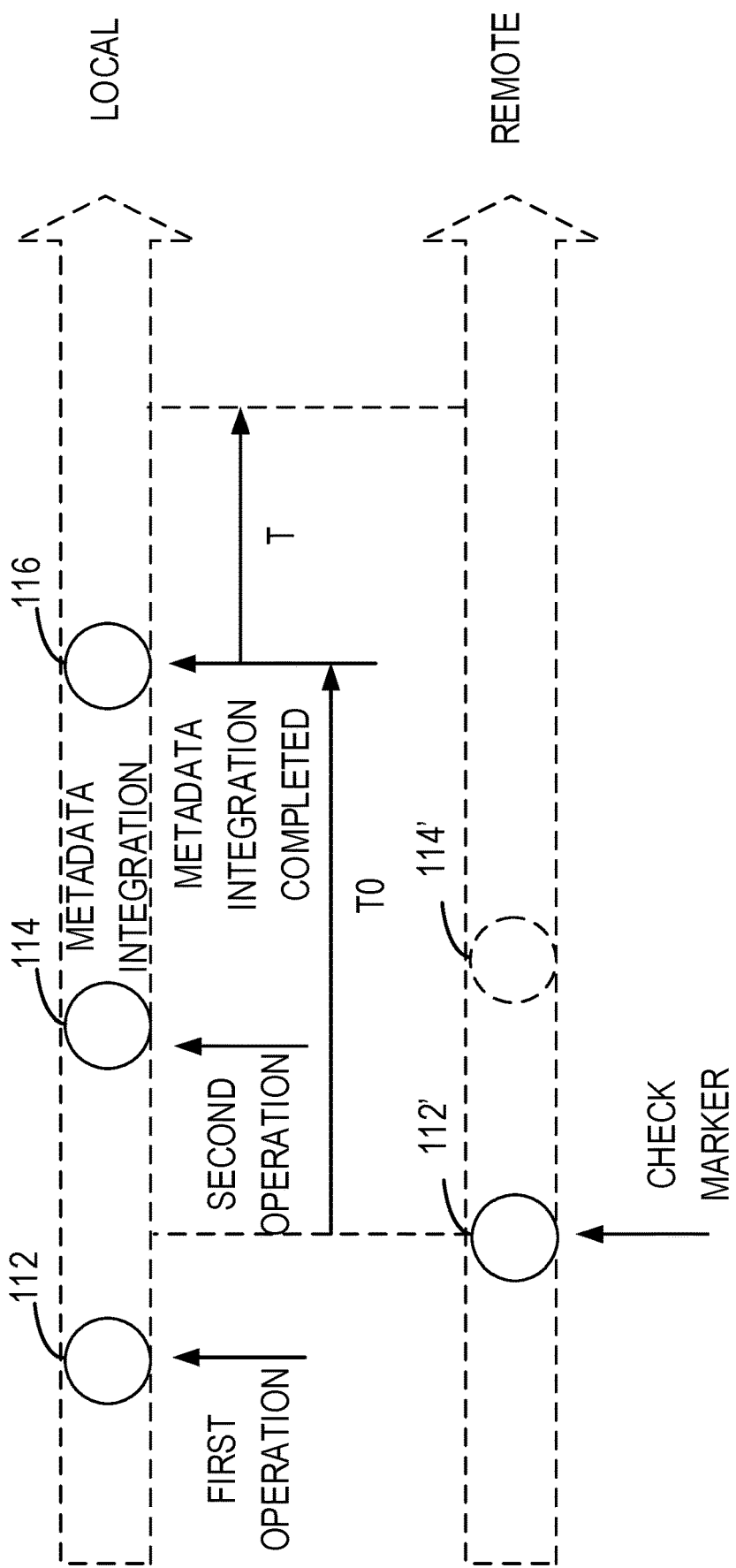
FIG. 4 illustrates a timing diagram of a solution for managing metadata according to an embodiment of the present disclosure.

FIG. 4 illustrates a timing diagram of a solution for managing metadata according to an embodiment of the present disclosure. The point 112 represents the point in time at which the user executes the first operation on the object in the local device 210 and the first operation may be a creation operation on the object. For example, in conjunction with FIG. 2, the first operation may generate the metadata 214-1 and the user data 216-1. The point 114 represents the point in time at which the user executes the second operation on the object, and the second operation may be an update operation on the object (modification, rewriting, deletion, etc.). For example, the second operation generates the metadata 214-2 and the second user data 216-2. The log information 212-1 and the log information 212-2 are associated with the first operation and the second operation respectively.

Since the indication of the location of the log information 212-1 and the location of the log information 212-2 are stored in the metadata 214-1 and 214-2 respectively, the local device 210 can obtain the indication of the location of the log information 212-1 (e.g., location 1) and an indication of the location of the log information 212-2 (e.g., location 2) from the metadata 214-1 and 214-2. In some embodiments, local device 210 obtains a check marker from the remote device 230 at time point 112'. For the first operation, the local device 210 may determine whether the location indicated by the check marker is the location 1 or subsequent to location 1, and if the location indicated by the check marker is the location 1 or subsequent to location 1, the local device 210 marks the metadata 214-1 generated by the first operation as removable. Compared to the prior art shown in FIG. 1, the local device 210 in FIG. 4 marks the metadata 214-1 as removable shortens the time range of time T0+T. In this way, the system's work efficiency has been significantly improved, and the resource reuse efficiency is increased.

Similarly, for the second operation, if the location indicated by the check marker obtained by the local device 210 at the time point 112' is the location 1, the metadata 214-2 generated by the second operation cannot be marked as removable, because the remote device 230 has not checked whether the metadata 214-2 and the user data 216-2 have been backed up. If the location indicated by the check marker obtained by the local device 210 at the time point 114' is the location 2 or location subsequent to location 2, the local device 210 marks the metadata 214-2 generated by the second operation as removable.

In some embodiments, the local device 210 can determine whether the operation on the object is an update operation, and if the operation is an update operation on the object (e.g., modification, rewriting, or deletion), then a metadata integration task is created. The metadata integration task integrates the metadata generated by the operation and metadata of the object into updated metadata. It should be understood that the creation on an object does not belong to the update operation. Therefore, if the local device determines that the operation on the object is a create operation, there is no need to create a metadata integration task.

Still considering FIG. 4 as an example, when the user executes the first operation on the object, since the first operation is a creation operation on the object, it is not necessary to create a metadata integration task. When the user executes the second operation on the object, since the second operation is an update operation on the object, the metadata integration task needs to be created to integrate the metadata 214-1 generated by the first operation and the metadata 214-2 generated by the second operation into updated metadata. In this manner, the local device 210 can determine which metadata in the metadata 214-1 marked as removable is useless metadata so that the useless metadata can be cleared in subsequent metadata clearance tasks to implement garbage collection. For example, if the second operation is a delete operation on the object, the metadata 214-1 generated by the first operation will be cleared in the subsequent metadata clearance task; if the second operation is a modification operation on the object, the modified portion in metadata 214-1 will be cleared in the metadata clearance task.

In general, a large amount of data can be stored in the local device 210, and executing operations on an object may include executing multiple operations on multiple objects, which can result in a very large number of metadata integration tasks in the local device 210. All metadata integration tasks are uniformly placed in a task pool and stand by, and threads can execute metadata integration tasks in the task pool. Due to the large number of metadata integration tasks in the task pool, if the order of execution of metadata integration tasks cannot be managed reasonably, the utilization efficiency of system resources will be greatly reduced.

Figure 5:
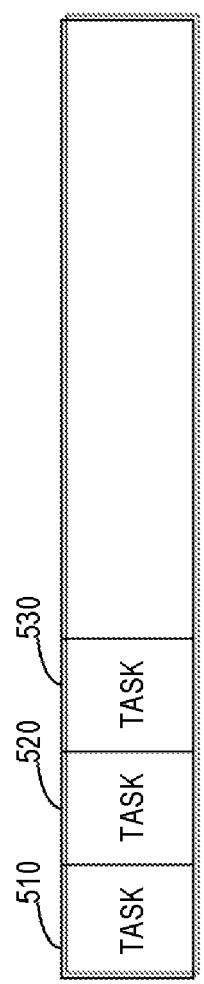
FIG. 5 illustrates a schematic diagram of determining a priority of executing a metadata integration task.

In some embodiments, since the indication of the location of the log information associated with the operation is stored in the corresponding metadata, the local device 210 can determine a priority of executing the metadata integration task in accordance with the order of the location of the log information in the log. FIG. 5 illustrates a schematic diagram of determining a priority of executing a metadata integration task. Task 510, task 520, and task 530 are metadata integration tasks to be executed. In task 510, task 520, and task 530, if the location of the log information corresponding to task 510 is at the front, the location of the log information corresponding to task 530 is at the last, and the location of the log information corresponding to task 520 is in the middle, then local device 210 may determine the priority of the task 510, the task 520 and the task 530 according to the order of location of the log information, that is, the task 510 with the a front log location has the highest priority, and the task 520 with a middle log location has the lower priority, the task 530 with a last location has the lowest priority.

Since the remote device 230 checks whether the data is backed up or not according to the order of the log information. Therefore, the data with the front log information location will be checked first, and the data to be checked first will mark the corresponding metadata as removable first in the local device 210, then the metadata integration task will be executed on the metadata marked as removable first, and there will be a greater chance to first clear the useless metadata therein. Therefore, according to the order of the location of the log information in the log to sort the priority of executing the metadata integration task, and the efficiency of garbage collection of useless metadata can be further improved.

Figure 6:
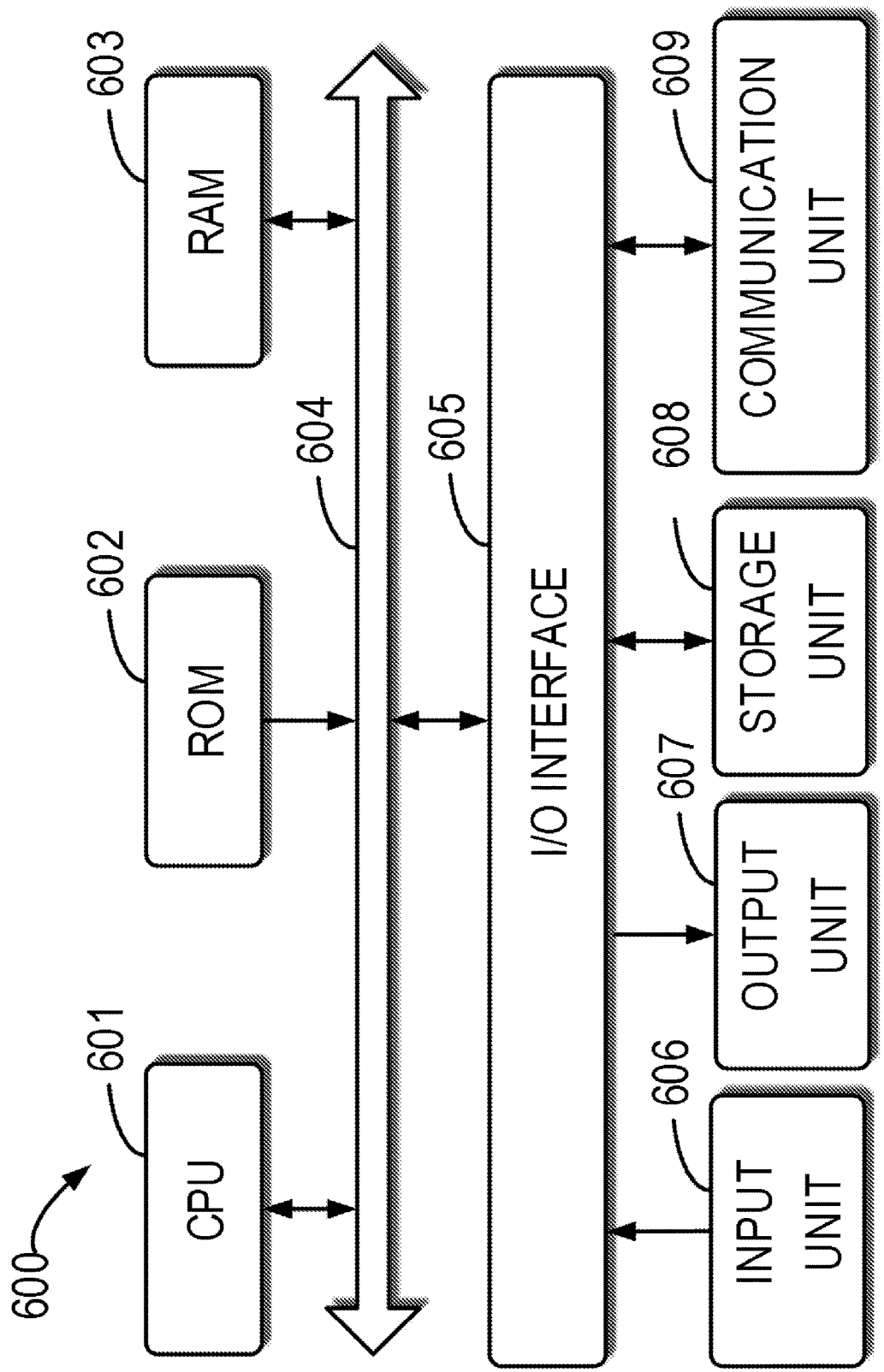
FIG. 6 illustrates a block diagram for implementing a device 600 in the embodiment of the present disclosure.

FIG. 6 illustrates a block diagram for implementing a device 600 in the embodiment of the present disclosure and the device 600 may be the local device 210 and the remote device 230 described above with respect to FIG. 1. As shown, the device 600 includes a central processing unit (CPU) 601 that can execute various appropriate actions and processes according to computer program instructions stored in read only memory (ROM) 602 or that being loaded from storage unit 608 into a computer in random access memory (RAM) 603. In the RAM 603, various programs and data required for the operation of the device 600 can also be stored. The CPU 601, the ROM 602 and the RAM 603 are connected to each other through a bus 604. An input/output (I/O) interface 605 is also connected to bus 604.

A plurality of components in device 600 are connected to I/O interface 605, including: input unit 606, such as a keyboard, mouse, etc.; output unit 607, such as various types of displays, speakers, etc.; storage unit 608, such as a disk, an optical disk, etc.; and a communication unit 609 such as a network card, a modem, a wireless communication transceiver, etc. Communication unit 609 allows device 600 to exchange information/data with other devices over a computer network such as the Internet and/or various telecommunication networks.

The various methods or processes described above may be executed by processing unit 601. For example, in some embodiments, a method can be implemented as a computer software program that is tangibly embodied in a machine-readable medium, such as storage unit 608. In some embodiments, par of or the entire computer program can be loaded and/or installed onto device 600 via ROM 602 and/or communication unit 609. When a computer program is loaded into RAM 603 and executed by CPU 601, one or more of the steps or actions of the methods or processes described above may be executed.

In some embodiments, the methods and processes described above can be implemented as a computer program product. The computer program product can include a computer-readable storage medium installed with computer-readable program instructions for executing various aspects of the present disclosure.

A computer-readable storage medium may be a tangible device that can hold and store the instructions used by the instruction execution device. The computer-readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of a computer-readable storage media include: portable computer disks, hard disks, random access memory (RAM), read only memory (ROM), erasable programmable read only memory (EPROM or flash memory), static random access memory (SRAM), portable compact disk read only memory (CD-ROM), digital versatile disk (DVD), memory stick, floppy disk, mechanical encoding device, for example, hole card stored with instructions or a raised structure in groove, and any suitable combination of the above. A computer-readable storage medium as used herein is not to be interpreted as a transient signal itself, such as a radio wave or other freely propagating electromagnetic wave, electromagnetic wave propagating through a waveguide or other transmission medium (e.g., a light pulse through a fiber optic cable), or the electrical signal transmitted through a wire.

The computer-readable program instructions described herein can be downloaded from a computer-readable storage medium to various computing/processing devices, or downloaded to an external computer or external storage device over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, or source code or object code written in one or any combination of more programming languages including object-oriented programming languages as well as conventional procedural programming languages. The computer-readable program instructions can be executed entirely on the user's computer, partly on the user's computer, as a stand-alone software package, partly on the user's computer, partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, customizing electronic circuit by utilizing state information of computer-readable program instructions, such as a programmable logic circuit, a field programmable gate array (FPGA), or a programmable logic array (PLA), the electronic circuit can execute computer-readable program instructions to implement various aspects of the present disclosure.

These computer-readable program instructions can be provided to a processing unit of a general purpose computer, a special purpose computer or other programmable data processing devices to produce a machine such that when the instructions are executed by processing unit of a computer or other programmable data processing devices, devices implementing the functions/actions specified in one or more of the flowcharts and/or block diagrams are generated. The computer-readable program instructions can also be stored in a computer-readable storage medium, which causes the computer, programmable data processing device, and/or other device to operate in a particular manner, such that the computer-readable medium stored with the instructions includes an article of manufacture that includes instructions for implementing various aspects of the functions/actions specified in one or more of the flowcharts and/or block diagrams.

Computer-readable program instructions can also be loaded onto a computer, other programmable data processing device, or other device to execute a series of operational steps on a computer, other programmable data processing device, or other device to produce a computer implementation processes such that instructions executed on a computer, other programmable data processing devices, or other device implement the functions/actions specified in one or more of the flowcharts and/or block diagrams.

The flowchart and block diagrams in the drawings illustrate the architecture, functionality, and operation of possible implementations of devices, methods, and computer program products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method, comprising:
   in response to performing metadata integration of first metadata and second metadata to transform the second metadata into updated metadata, delaying, by a system comprising a processor, marking the first metadata as removable until the updated metadata is backed up;
   obtaining, by a system comprising a processor, a check marker from a remote device;
   determining whether the check marker indicates that user data and the updated metadata have been backed up in the remote device, the user data and the updated metadata being generated based on an operation executed on an object; and
   in response to the check marker indicating that the user data and the updated metadata have been backed up in the remote device:
   marking the first metadata as removable, and
   performing garbage collection on the first metadata.

2. The method of claim 1, wherein the determining whether the check marker indicates that the user data and the updated metadata have been backed up in the remote device comprises:
   obtaining, from the updated metadata, an indication of a location of log information in a log, the log information being associated with the operation;
   determining whether a location indicated by the check marker is the location of the log information or another location subsequent to the location of the log information; and
   in response to the location indicated by the check marker being the location of the log information or the other location subsequent to the location of the log information, determining that the check marker indicates that the user data and the updated metadata have been backed up in the remote device.

3. The method of claim 1, further comprising:
   determining whether the operation is an update operation on the object.

4. The method of claim 3, wherein the determining whether the operation is the update operation on the object comprises:
   determining whether the operation is at least one of a modification, a rewriting, or a deletion of the object.

5. The method of claim 3, further comprising:
   in response to the operation being the update operation on the object, creating the metadata integration task.

6. The method of claim 5, further comprising:
   determining a priority of executing the metadata integration task according to an order of the location of the log information in the log.

7. A device comprising:
   a processor; and
   a memory storing computer program instructions, the processor executing the computer program instructions in the memory to control the device to perform operations comprising:
   in response to performing metadata integration of first metadata and second metadata that comprises transforming the second metadata into updated metadata, delaying marking the first metadata as the removable metadata until the updated metadata is backed up;
   obtaining a check marker from a remote device;
   determining whether the check marker indicates that user data and the updated metadata have been backed up in the remote device, the user data and the updated metadata being generated based on an operation executed on an object; and
   in response to the check marker indicating that the user data and the updated metadata have been backed up in the remote device:
   marking the first metadata as removable, and
   performing garbage collection on the first metadata.

8. The device of claim 7, wherein the determining whether the check marker indicates that the user data and the updated metadata have been backed up in the remote device comprises:
   obtaining, from the updated metadata, an indication of a location of log information in a log, the log information being associated with the operation;
   determining whether a location indicated by the check marker is the location of the log information or another location subsequent to the location of the log information; and
   in response to the location indicated by the check marker being the location of the log information or the other location subsequent to the location of the log information, determining that the check marker indicates that the user data and the updated metadata have been backed up in the remote device.

9. The device of claim 7, the operations further comprising:
   determining whether the operation is an update operation on the object; and
   in response to the operation being the update operation on the object, creating the metadata integration task.

10. The device of claim 9, wherein the determining whether the operation is the update operation on the object comprises:
    determining whether the operation is a modification operation.

11. The device of claim 9, wherein the determining whether the operation is the update operation on the object comprises:
    determining whether the operation is a deletion of the object.

12. The device of claim 9, wherein the determining whether the operation is the update operation on the object comprises:
   determining whether the operation is a rewriting operation, or deletion of the object.

13. The device of claim 8, the operations further comprising:
   determining a priority of executing the metadata integration task according to an order of the location of the log information in the log.

14. A non-transitory computer-readable medium comprising computer programs stored thereon, the computer program when executed by a processor causing the processor to perform operations, comprising:
   as part of performing metadata integration of first metadata and second metadata that comprises transforming the second metadata into updated metadata, delaying marking the first metadata as the removable metadata until the updated metadata is backed up;
   obtaining a check marker from a remote device;
   determining whether the check marker indicates that user data and the updated metadata have been backed up in the remote device, the user data and the updated metadata being generated based on an operation executed on an object; and
   in response to the check marker indicating that the user data and the updated metadata have been backed up in the remote device:
      marking the first metadata as removable, and
      performing garbage collection on the first metadata.

15. The non-transitory computer-readable medium of claim 14, wherein the determining whether the check marker indicates that the user data and the updated metadata have been backed up in the remote device comprises:
   obtaining, from the updated metadata, an indication of a location of log information in a log, the log information being associated with the operation;
   determining whether a location indicated by the check marker is the location of the log information or another location subsequent to the location of the log information; and
   in response to the location indicated by the check marker being the location of the log information or the other location subsequent to the location of the log information, determining that the check marker indicates that the user data and the updated metadata have been backed up in the remote device.

16. The non-transitory computer-readable medium of claim 14, the operations further comprising:
   determining whether the operation is an update operation on the object; and
   in response to the operation being the update operation on the object, creating the metadata integration task.

17. The non-transitory computer-readable medium of claim 16, wherein the determining whether the operation is the update operation on the object comprises:
   determining whether the operation is a modification operation.

18. The non-transitory computer-readable medium of claim 16, wherein the determining whether the operation is the update operation on the object comprises:
   determining whether the operation is a deletion of the object.

19. The non-transitory computer-readable medium of claim 15, the operations further comprising:
   determining a priority of executing the metadata integration task according to an order of the location of the log information in the log.

20. The non-transitory computer-readable medium of claim 16, wherein the determining whether the operation is the update operation on the object comprises:
   determining whether the operation is a rewriting operation, or deletion of the object.

* * * * *